(12) United States Patent
Lin

(10) Patent No.: US 9,875,351 B2
(45) Date of Patent: Jan. 23, 2018

(54) METHODS, APPARATUSES, AND COMPUTER PROGRAM PRODUCTS FOR HIDING ACCESS TO INFORMATION IN AN IMAGE

(71) Applicant: Nokia Technology Oy, Espoo (FI)

(72) Inventor: Jianming Lin, Beijing (CN)

(73) Assignee: Nokia Technologies Oy, Espoo (FI)

( * ) Notice: Subject to any disclaimer, the term of this patent is extended or adjusted under 35 U.S.C. 154(b) by 40 days.

(21) Appl. No.: 14/904,024

(22) PCT Filed: Jul. 16, 2013

(86) PCT No.: PCT/CN2013/079444
§ 371 (c)(1),
(2) Date: Jan. 8, 2016

(87) PCT Pub. No.: WO2015/006912
PCT Pub. Date: Jan. 22, 2015

(65) Prior Publication Data
US 2016/0162679 A1    Jun. 9, 2016

(51) Int. Cl.
*G06F 21/36* (2013.01)
*G06F 21/62* (2013.01)

(52) U.S. Cl.
CPC .............. *G06F 21/36* (2013.01); *G06F 21/62* (2013.01); *G06F 2203/04806* (2013.01); *G06F 2221/2103* (2013.01); *G06F 2221/2111* (2013.01)

(58) Field of Classification Search
CPC ....................... G06F 21/36; G06F 2203/04806
See application file for complete search history.

(56) References Cited

U.S. PATENT DOCUMENTS 8,391,543 B1    3/2013  Verma
2006/0206717 A1  9/2006  Holt et al.
(Continued)

FOREIGN PATENT DOCUMENTS

| EP | 2410450 A1 | 1/2012 |
|---|---|---|
| JP | 2012-022059 A | 2/2012 |
| KR | 2001-0044804 A | 6/2001 |

OTHER PUBLICATIONS

International Search Report and Written Opinion received for corresponding Patent Cooperation Treaty Application No. PCT/CN2013/079444, dated Apr. 22, 2014, 12 pages.
(Continued)

*Primary Examiner* — James Turchen
(74) *Attorney, Agent, or Firm* — Harrington & Smith

(57) ABSTRACT

Methods, apparatuses, and computer program products are herein provided for hiding access to information in an image. A method may include receiving user input indicating a desire of a user to magnify a region within an image to a level of magnification. The method may further include causing the region to be magnified to the level of magnification. The method may further include determining whether the region is associated with at least one of an application or information and determining whether the level of magnification satisfies a level of magnification threshold. The method may further include causing the at least one application to be launched or information to be opened in an instance in which the region is associated with the at least one of an application or information and the level of magnification satisfies the level of magnification threshold. Corresponding apparatuses and computer program products are also provided.

14 Claims, 15 Drawing Sheets

(56) References Cited

U.S. PATENT DOCUMENTS

| | | |
|---|---|---|
| 2008/0297853 A1 | 12/2008 | Yang et al. |
| 2010/0046486 A1 | 2/2010 | Maruyama |
| 2010/0186074 A1 | 7/2010 | Stavrou et al. |
| 2010/0322485 A1* | 12/2010 | Riddiford ............... G06F 21/36 382/115 |
| 2011/0072510 A1 | 3/2011 | Cheswick |
| 2011/0194727 A1 | 8/2011 | Guo et al. |
| 2011/0197259 A1 | 8/2011 | Thibadeau et al. |
| 2012/0313847 A1 | 12/2012 | Boda et al. |
| 2012/0315607 A1* | 12/2012 | Shin ...................... G06F 3/0488 434/114 |
| 2013/0083079 A1* | 4/2013 | Paushkina ............. G06F 3/0488 345/668 |
| 2013/0135234 A1* | 5/2013 | Hisano ................... G06F 3/017 345/173 |
| 2014/0282973 A1* | 9/2014 | Langley ................. H04L 63/08 726/7 |
| 2016/0342834 A1* | 11/2016 | Ragnet ............... G06K 9/00463 |
| 2017/0032113 A1* | 2/2017 | Tunnell ................. G06F 21/316 |

OTHER PUBLICATIONS

"Four Ways to Hide Information Inside Image and Sound Objects", Linux.com, Retrieved on Feb. 2, 2017, Webpage available at : https://www.linux.com/news/four-ways-hide-information-inside-image-and-sound-objects.

"Steganography in Depth", Cubic Race, Retrieved on Feb. 2, 2017, Webpage available at : http://www.pcclm.com/2011/05/steganography-in-depth.html.

Extended European Search Report received for corresponding European Patent Application No. 13889358.1, dated Feb. 3, 2017, 9 pages.

\* cited by examiner

METHODS, APPARATUSES, AND COMPUTER PROGRAM PRODUCTS FOR HIDING ACCESS TO INFORMATION IN AN IMAGE

RELATED APPLICATION

This application was originally filed as PCT Application No. PCT/CN2013/079444 filed Jul. 16, 2013.

TECHNOLOGICAL FIELD

An example embodiment of the present invention relates generally to user interface technology and, more particularly, relates to methods, apparatuses, and computer program products for hiding access to information in an image.

BACKGROUND

The modern communications era has brought about a tremendous expansion of wireline and wireless networks, thereby providing more flexibility and immediacy of information transfer. Moreover, an expansion in computing power has resulted in development of affordable mobile computing devices capable of taking advantage of services made possible by modern networking technologies. Indeed, mobile computing devices can be used to perform a variety of functions, including use along with sensitive applications or information.

BRIEF SUMMARY

It is important, however, to protect the sensitive applications and information. In some cases, such information may be protected by a password. However, requiring a password may actually serve to highlight the sensitive applications or information.

As noted above, mobile computing devices can be used to perform other functions, such as presenting images on a display. Some of these images may be dense and require a large amount of pixels for presentation.

Some embodiments of the present invention seek to use images to hide access to sensitive information. In such a regard, an image may form a basis for a user to launch an application or open information. This requires the user to know where within the large image to interact with in order to launch the application or open the information. Said differently, a certain location or region within an image may enable a user to launch the sensitive application or open the sensitive information. However, that location or region may not be readily apparent to someone looking at the image on the display. In this way, the person looking at the image may not actually know that it is even possible to launch the sensitive application or open the sensitive information from the image.

As such, some example embodiments of the present invention seek to hide access to information in an image. In one example embodiment, a method includes receiving user input indicating a desire of a user to magnify a region within an image presented on a display to a level of magnification. The method further includes causing the region within the image to be magnified to the level of magnification. The method further includes determining whether the region is associated with at least one of an application or information. The method further includes determining whether the level of magnification satisfies a level of magnification threshold. The method further includes causing the at least one application to be launched or information to be opened in an instance in which the region is associated with the at least one of an application or information and the level of magnification satisfies the level of magnification threshold.

In some embodiments, the method may further include determining whether the level of magnification satisfies the level of magnification threshold by determining whether a graphical element within the region defines a size that occupies a predetermined area of the display. In some embodiments, the method may further include causing the at least one application to be launched or information to be opened by automatically causing the at least one application to be launched or information to be opened in an instance in which the region is associated with at least one of an application or information and the level of magnification satisfies the level of magnification threshold.

In some embodiments, the method may further include receiving a second user input indicating a location within the region after causing the region of the image to be magnified to the level of magnification. Additionally, the method may include determining whether the location within the region is associated with at least one of an application or information. Further, the method may include causing the at least one application to be launched or information to be opened by causing the at least one application to be launched or information to be opened in an instance in which (i) the region is associated with the at least one of an application or information, (ii) the level of magnification satisfies the level of magnification threshold, and (iii) the location within the region is associated with the at least one application or information.

Additionally, in some embodiments, the location within the region indicated by the second user input comprises an icon presented over the image at the location such that the icon is associated with the at least one application or information. Alternatively, in some embodiments, the location within the region indicated by the second user input comprises an object within the image at the location such that the object is associated with the at least one application or information. In some embodiments, the method may further include determining whether the level of magnification satisfies the level of magnification threshold by determining whether a size of the icon or object within the region satisfies a predetermined size such that the icon or object is selectable by a user.

Additionally, in some embodiments, the method may further include receiving a third user input indicating a second location within the image. Additionally, the method may include determining whether receiving the third user input indicating the second location after receiving the second user input indicating the first location satisfies a sequence associated with the at least one application or information. Further, the method may include causing the at least one application to be launched or information to be opened by causing the at least one application to be launched or information to be opened in an instance in which receiving the third user input indicating the second location after receiving the second user input indicating the first location satisfies the sequence associated with the at least one application or information.

In some embodiments, the level of magnification threshold defines a range of levels of magnification such that the level of magnification satisfies the level of magnification threshold in an instance in which the level of magnification is above a minimum level of magnification threshold and below a maximum level of magnification threshold. In some embodiments, the image comprises at least 100,000,000- pixels, in other embodiments, at least 500,000,000, and in other embodiments, at least 1,000,000,000 pixels.

In some embodiments, the method may further include causing the image to be presented on the display of a device. Additionally, the method may include causing guidance to be provided to the user for finding the region of the image associated with the at least one application or information.

In some embodiments, the method may further include causing the image to be presented on the display of a device, wherein the image defines a plurality of regions. Each region may be associated with at least one different application or information. Additionally, at least two different regions may each be associated with a different level of magnification threshold.

In another example embodiment, an apparatus comprises at least one processor and at least one memory storing computer program code with the at least one memory and stored computer program code being configured, with the at least one processor, to cause the apparatus to receive user input indicating a desire of a user to magnify a region within an image presented on a display to a level of magnification. The at least one memory and stored computer program code are configured, with the at least one processor, to further cause the apparatus to cause the region within the image to be magnified to the level of magnification. The at least one memory and stored computer program code are configured, with the at least one processor, to further cause the apparatus to determine whether the region is associated with at least one of an application or information. The at least one memory and stored computer program code are configured, with the at least one processor, to further cause the apparatus to determine whether the level of magnification satisfies a level of magnification threshold. The at least one memory and stored computer program code are configured, with the at least one processor, to further cause the apparatus to cause the at least one application to be launched or information to be opened in an instance in which the region is associated with the at least one of an application or information and the level of magnification satisfies the level of magnification threshold.

In another example embodiment, a computer program product is provided. The computer program product of this example embodiment includes at least one computer-readable storage medium having computer-readable program instructions stored therein. The program instructions of this example embodiment comprise program instructions configured to cause an apparatus to perform a method including receiving user input indicating a desire of a user to magnify a region within an image to a level of magnification. The method further includes causing the region within the image to be magnified to the level of magnification. The method further includes determining whether the region is associated with at least one of an application or information. The method further includes determining whether the level of magnification satisfies a level of magnification threshold. The method further includes causing the at least one application to be launched or information to be opened in an instance in which the region is associated with the at least one of an application or information and the level of magnification satisfies the level of magnification threshold.

In another example embodiment, an apparatus is provided. The apparatus comprises means for receiving user input indicating a desire of a user to magnify a region within an image to a level of magnification. The apparatus further comprises means for causing the region in the image to be magnified to the level of magnification. The apparatus further comprises means for determining whether the region is associated with at least one of an application or information. The apparatus further comprises means for determining whether the level of magnification satisfies a level of magnification threshold. The apparatus further comprises means for causing the at least one application to be launched or information to be opened in an instance in which the region is associated with the at least one of an application or information and the level of magnification satisfies the level of magnification threshold.

Some examples of embodiments may store the level of magnification required to trigger access to certain applications as meta-data associated with the image. Such meta-data may be encrypted to prevent any by-pass of the security feature the image provides to restrict access to certain application(s).

In some examples of embodiments of the invention, the level of magnification may be provided as a zoom level value. In some examples of embodiments of the invention, when a desired zoom level is applied to zoom in or magnify part of an image, this may trigger certain features to be accessible in the image (i.e., when the level of magnification takes the form of a 20 times zoom level when an image has a pre-determined size on a display). In some examples of embodiments of the invention, a region of an image is associated with information and/or an application by determining if meta-data is associated with the region in the image. Alternatively, in some examples of embodiments of the invention, displaying the region may automatically trigger embedded code in the image to check if one or more conditions are met to launch an application/access information. Any suitable manner for associating an image region with a check for whether one or more conditions are met to access information/launch an application may, however, be used by examples of embodiments of the invention. In some examples of embodiments of the invention, a conditions which are checked before access to an application is provided and/or information displayed include whether the size of region associated with the application/information currently displayed is sufficiently above a threshold size. Other conditions may include the region size must be sufficient relative to the overall displayed size of the image or image portion visible when the image is magnified on the display. One or more of the minimum region size, displayed image size, and associated zoom or magnification of the image, may be suitably stored in association with the image to enable the image to be used to access information/applications on more than one device and/or even when the image is displayed at different sizes on a device. In some examples of embodiments, including for example if the displayed image size is unlikely to change, for example, if the image comprises a wallpaper or similar image for an entire display and the image is never used on another device, the meta-data stored may not include the image size as this is now fixed and set by the display of the device and may instead just comprise the required magnification level of the image when a particular region is viewed (which may take the form of a zoom level) to access information/one or more application(s). In some examples of embodiments, references in the description and claims to one or more levels of magnification or magnification level(s) of or in an image may refer to a zoom level for the image. The portion of the image which is to be magnified or zoomed in on may also be defined by meta-data associated with the image with an indication for a particular information and/or application, so that simply selecting to enlarge an image by a certain amount does not trigger access to the application/information, instead, it is the portion of the image which is enlarged (i.e., the region associated with access to the information/application) that must be presented on the display at the correct magnification/zoom level. Any suitable manner of associating regions of an image with access to information/application(s) may be used instead of meta-data as would be apparent to anyone of ordinary skill in the art in some examples embodiments of the invention.

BRIEF DESCRIPTION OF THE DRAWINGS

Figure 1:
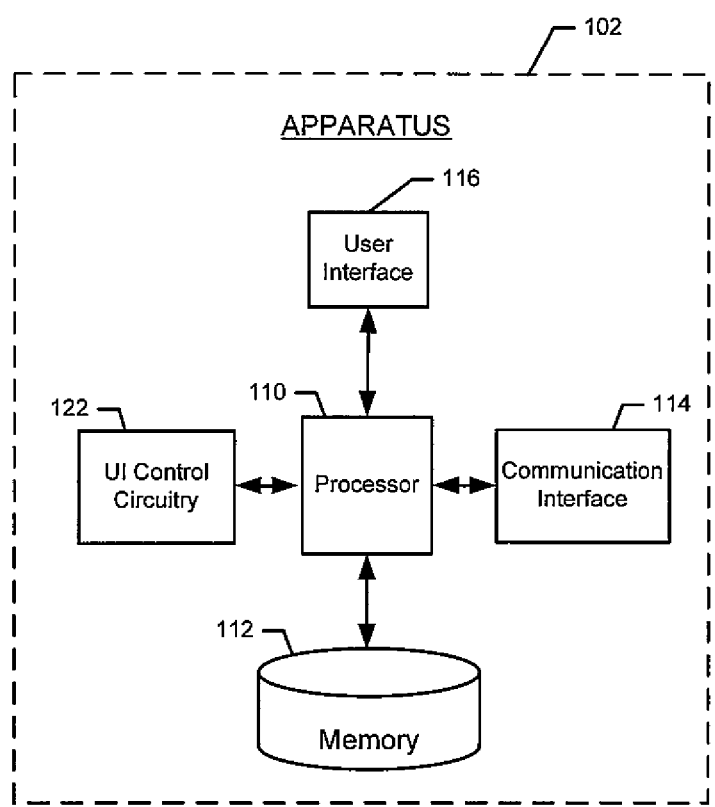
Figure 2:
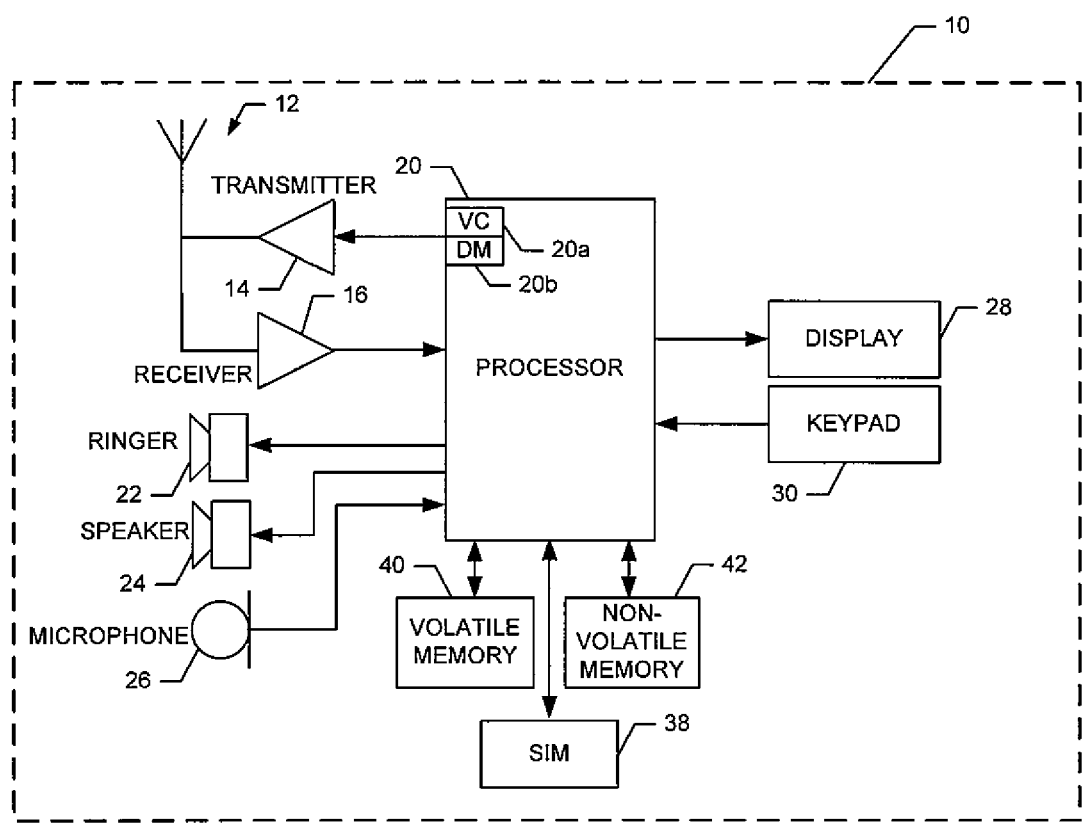
Figure 3:
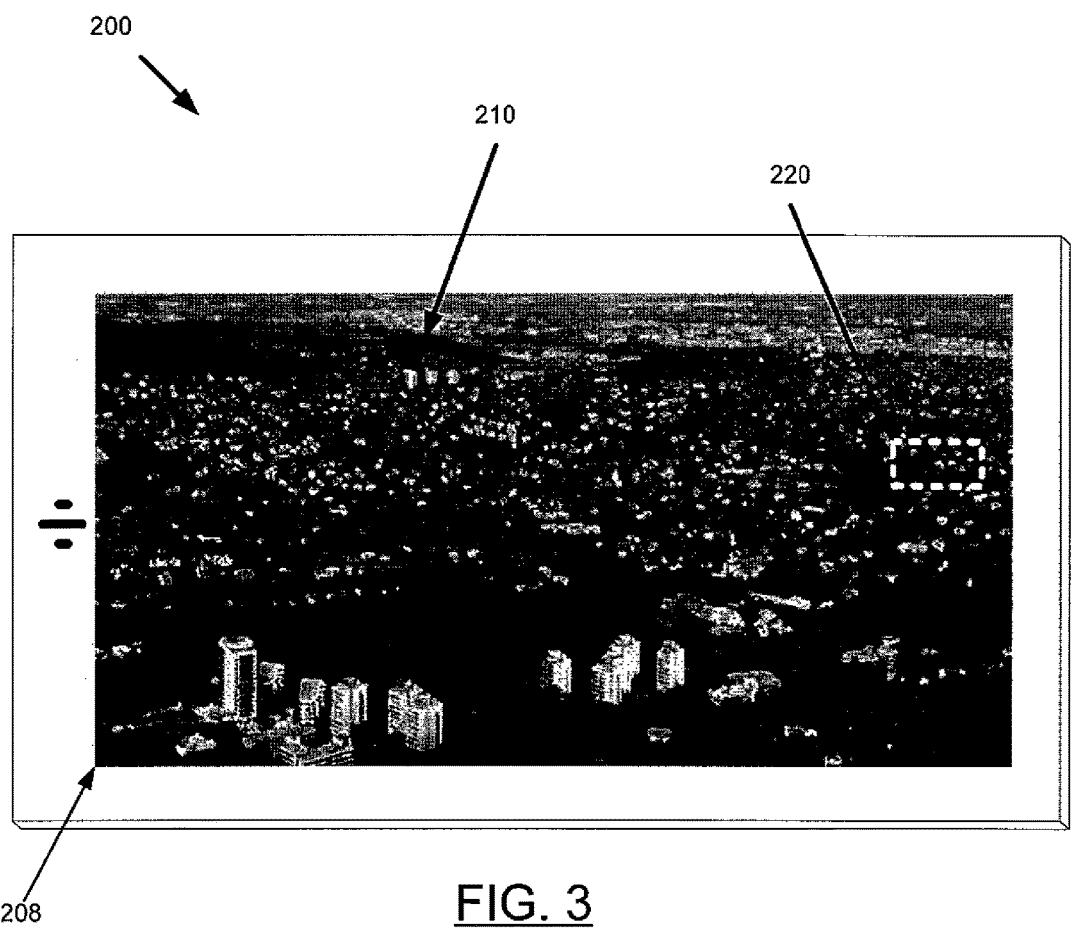
Figure 4:
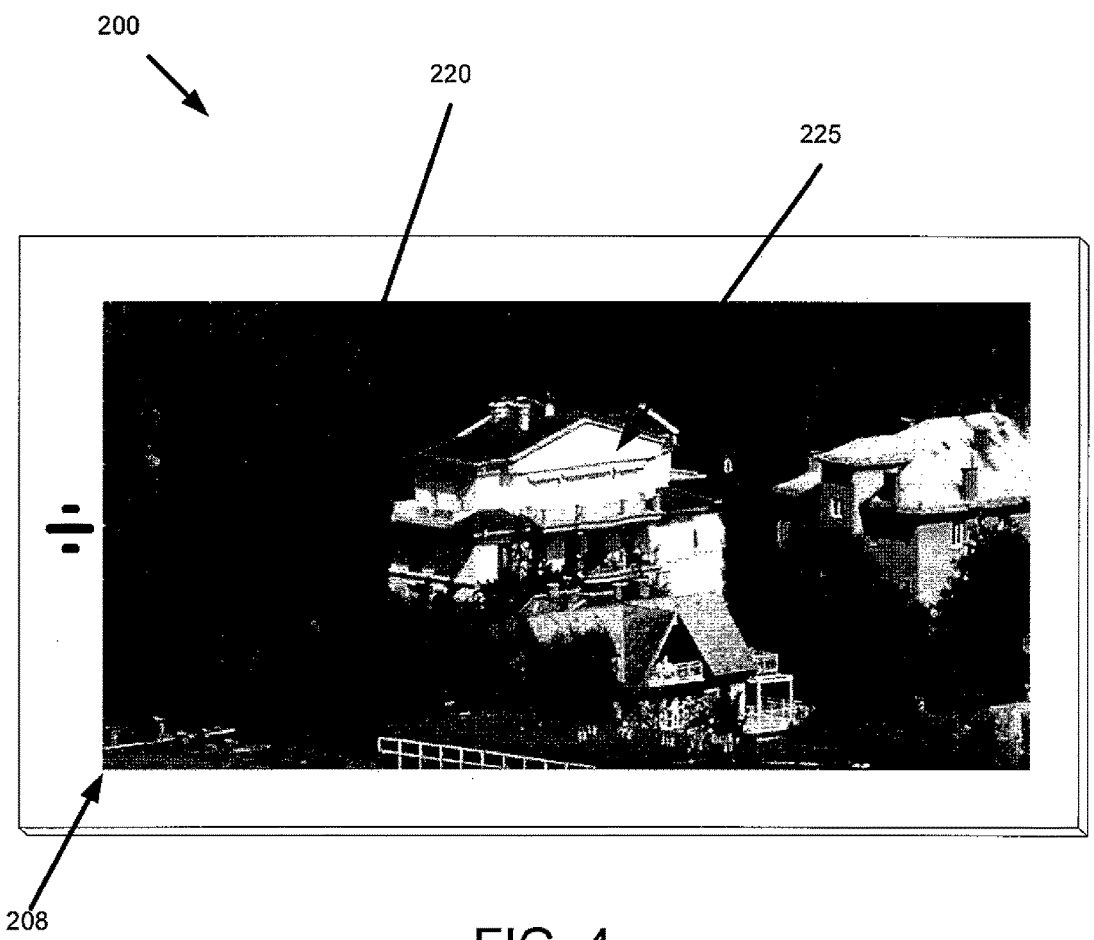
Figure 5:
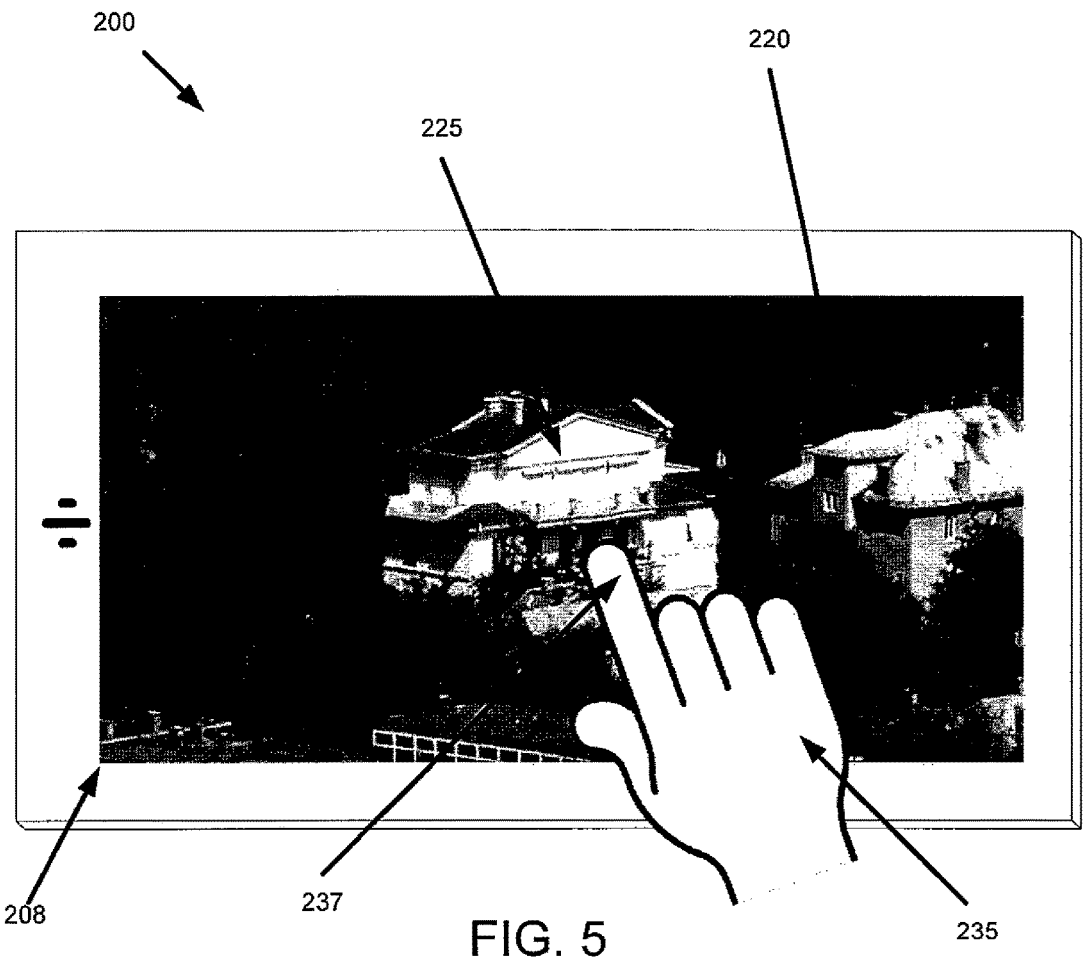
Figure 6:
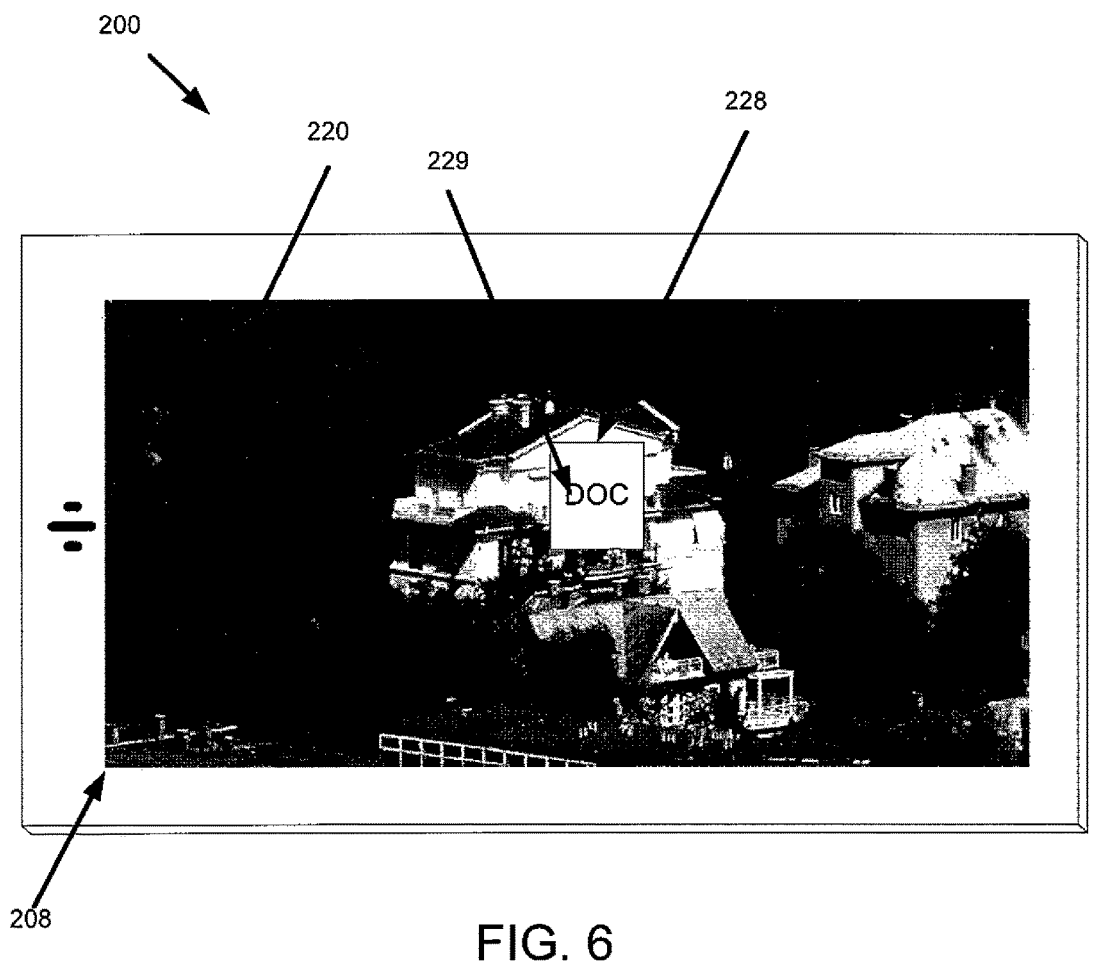
Figure 7:
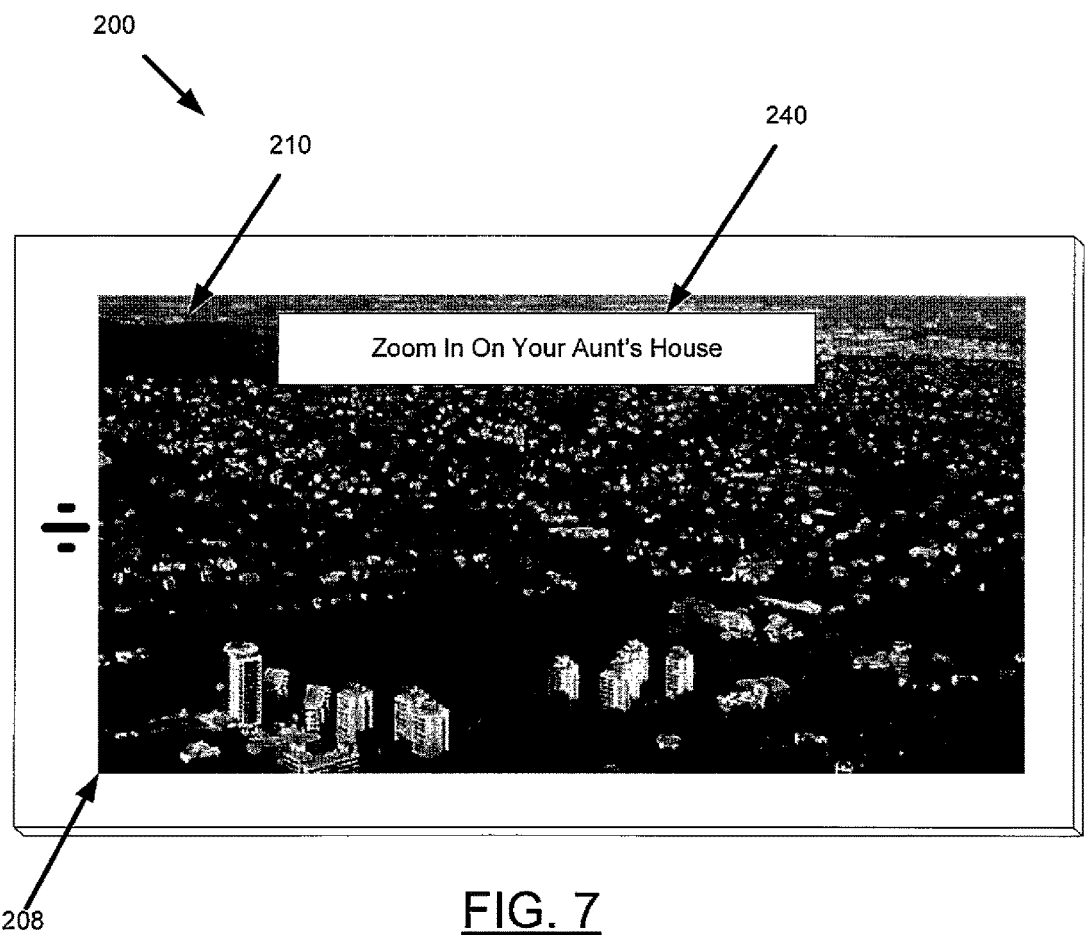
Figure 8:
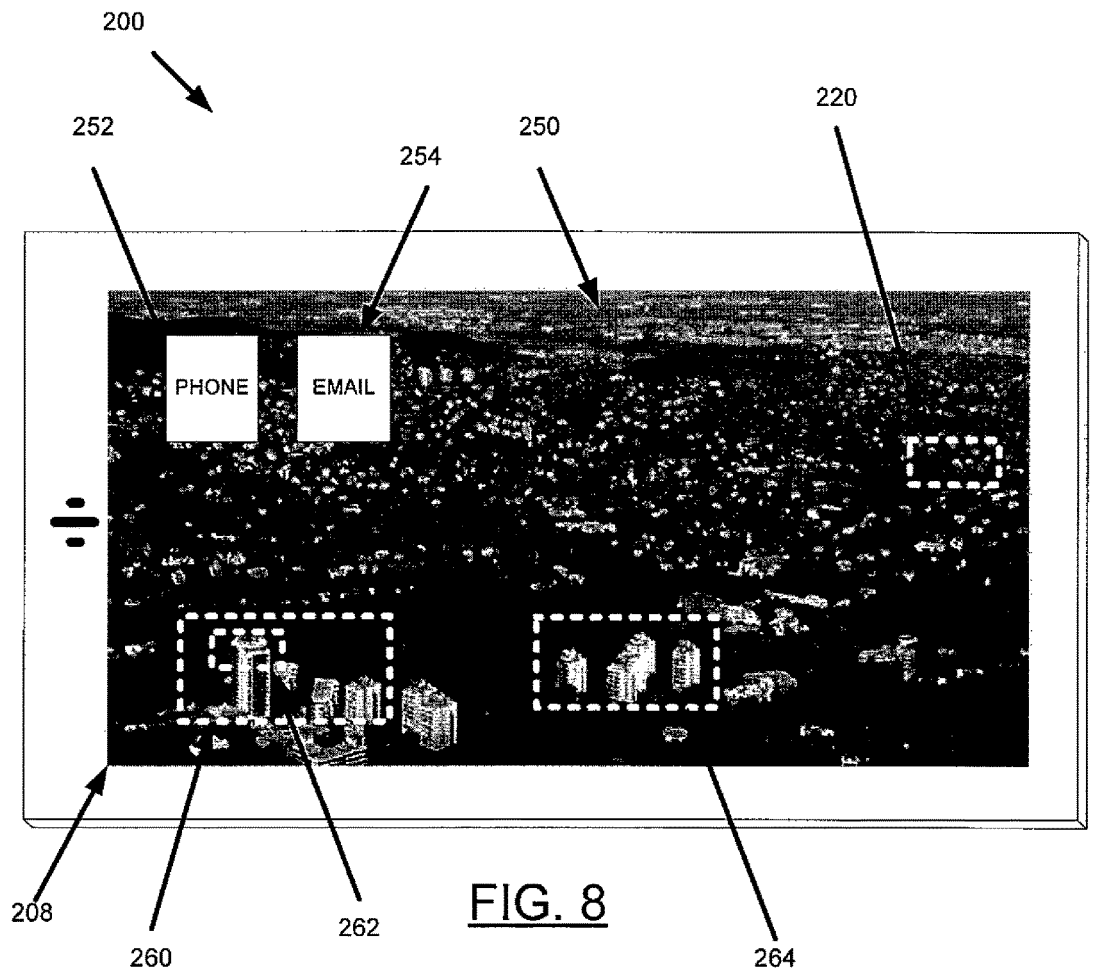
Figure 9:
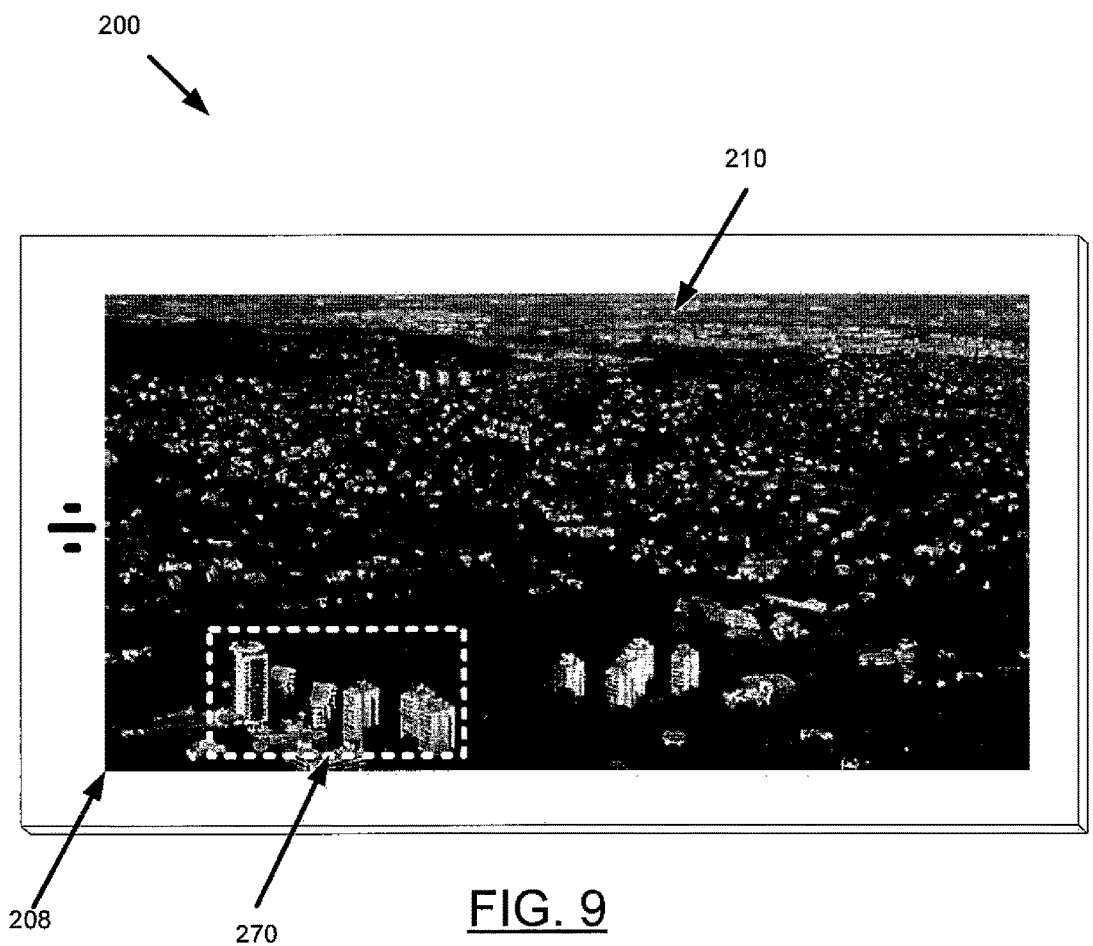
Figure 10:
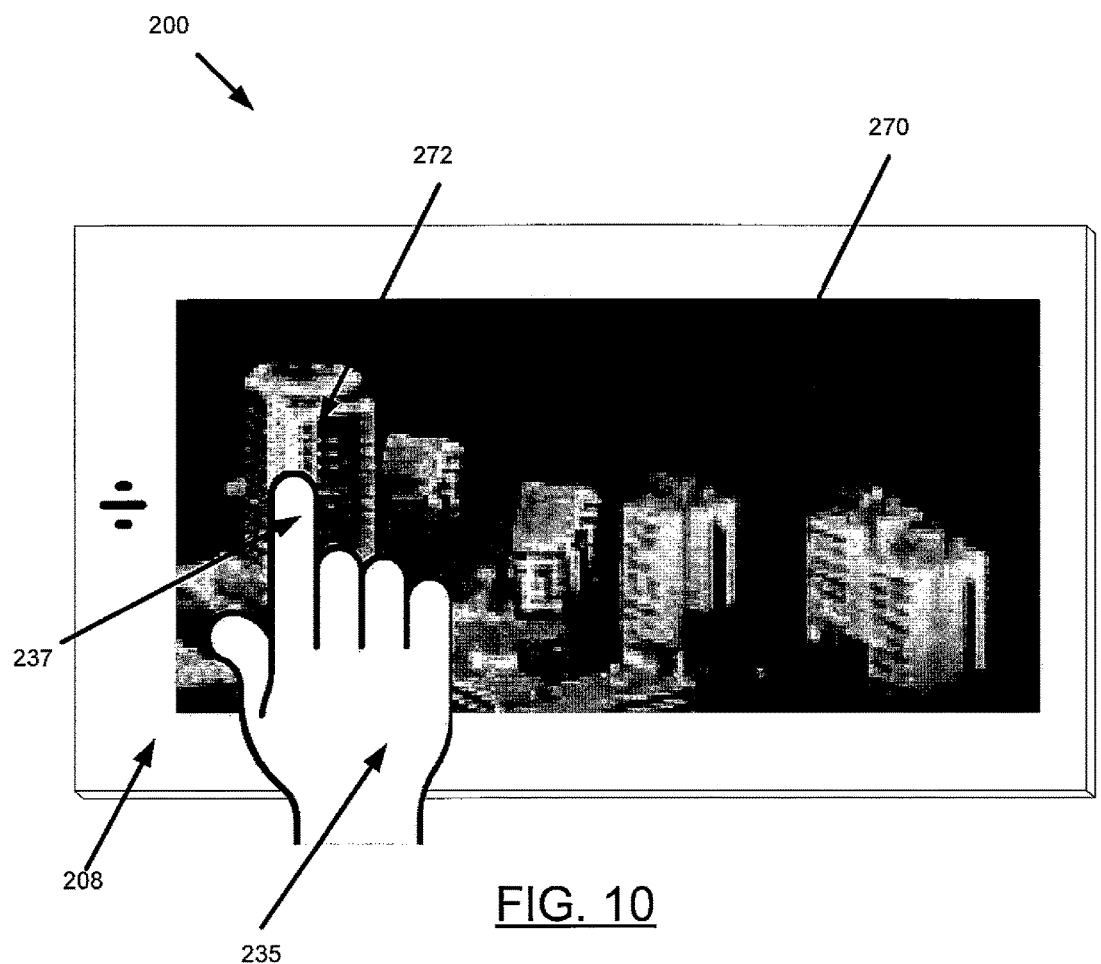
Figure 11:
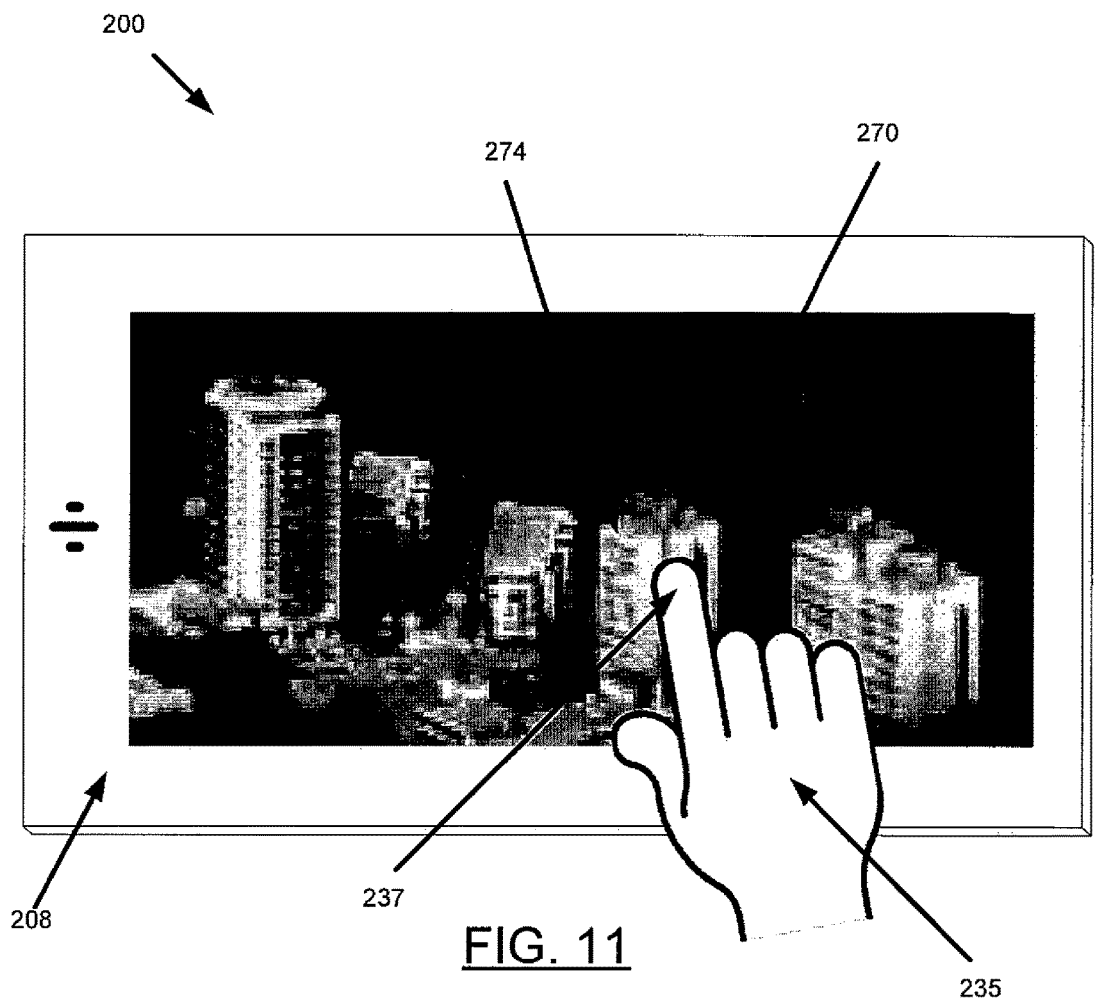
Figure 12:
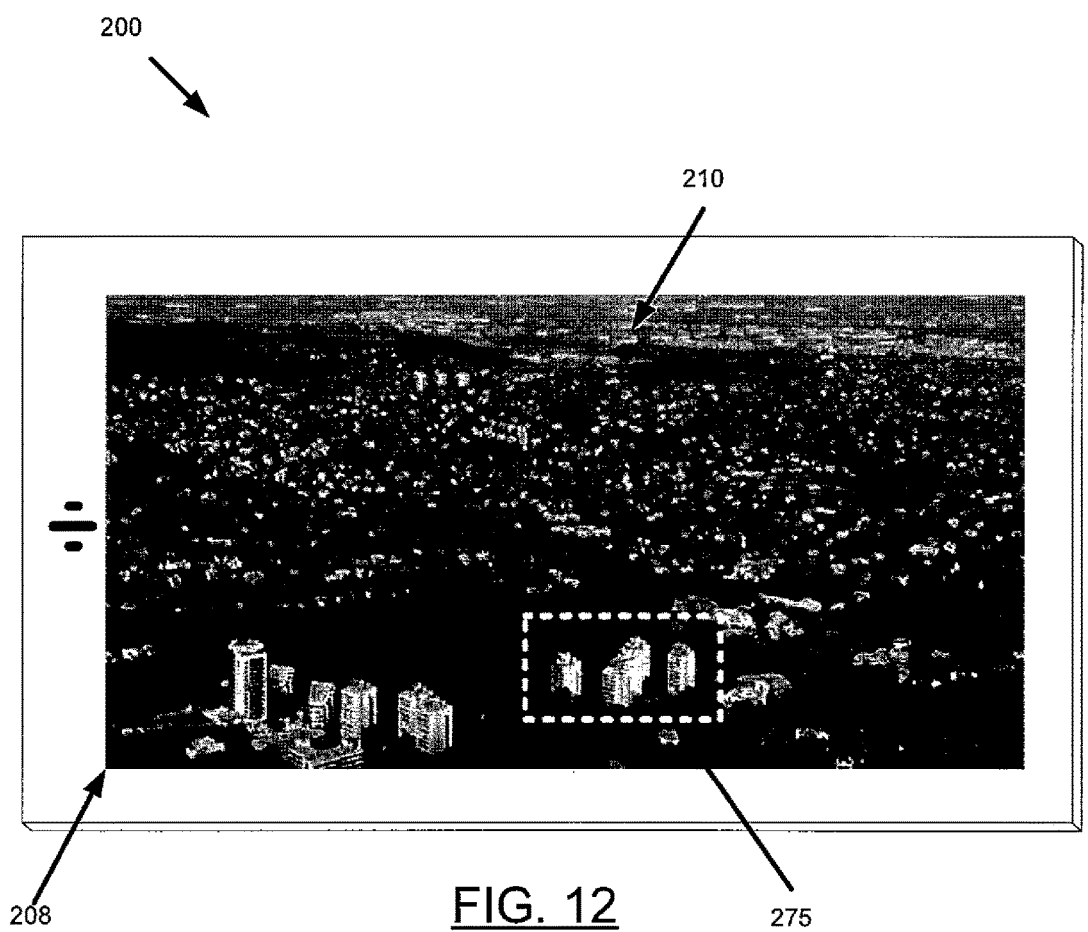
Figure 13:
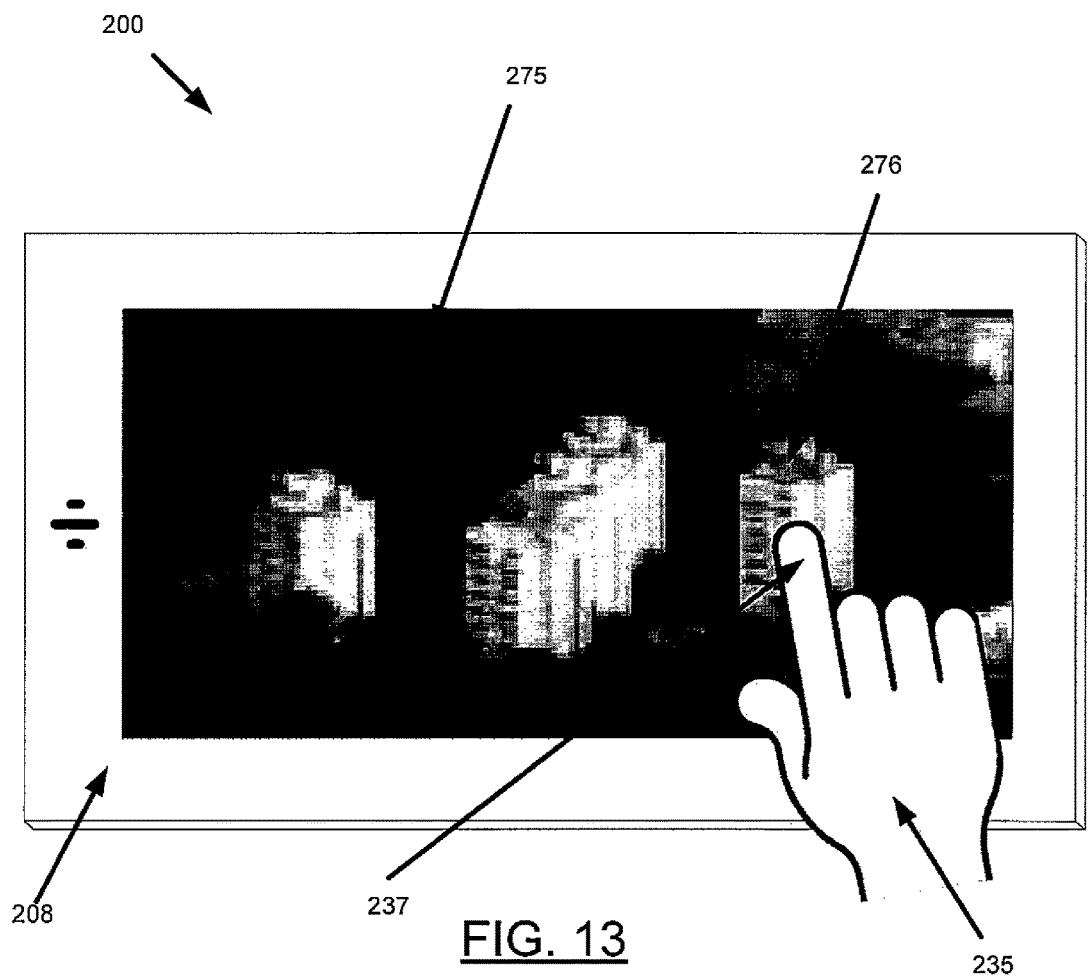
Figure 14:
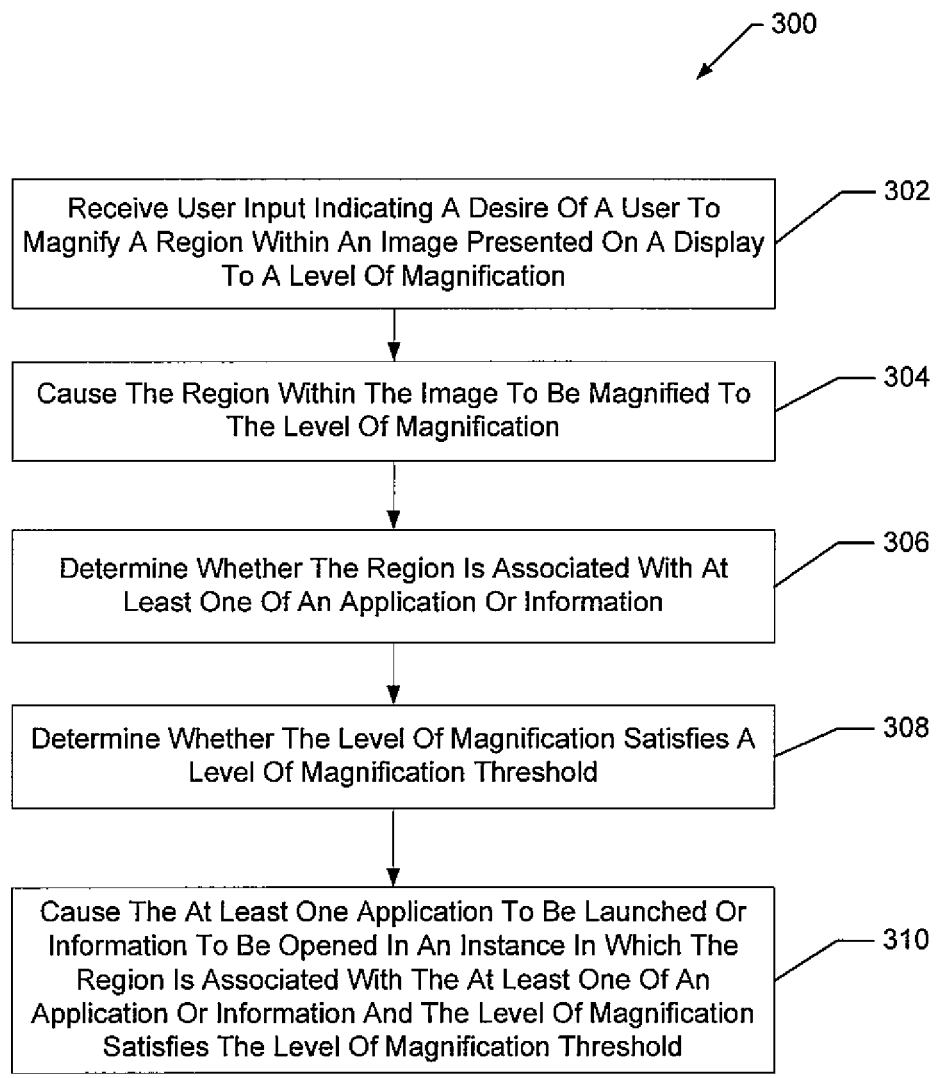
Figure 15:
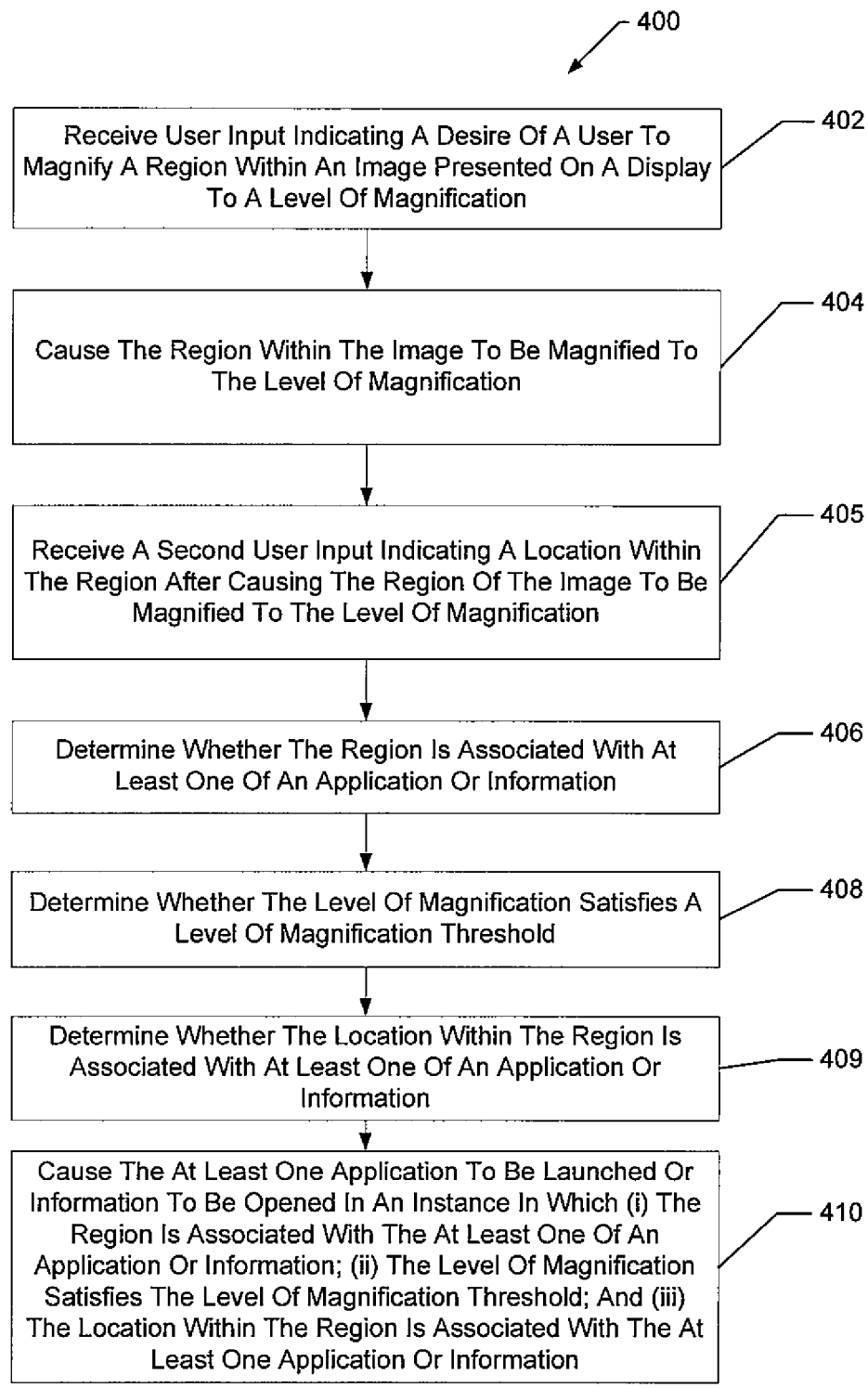

Having thus described some embodiments of the invention in general terms, reference will now be made to the accompanying drawings, which are not necessarily drawn to scale, and wherein:

FIG. 1 illustrates a block diagram of an apparatus according to an example embodiment of the present invention;

FIG. 2 is a schematic block diagram of a mobile terminal according to an example embodiment of the present invention;

FIG. 3 illustrates an example of a device, such as the apparatus shown in FIG. 1, with an example of an image being presented on a display of the device, wherein a region of the image is outlined, in accordance with an example embodiment of the present invention described herein;

FIG. 4 illustrates the device shown in FIG. 3, wherein the region of the image has been magnified, in accordance with an example embodiment of the present invention described herein;

FIG. 5 illustrates the device shown in FIG. 3, wherein a user is providing input to an object within the region of the image presented on the display of the device, in accordance with an example embodiment of the present invention described herein;

FIG. 6 illustrates the device shown in FIG. 3, wherein an icon is presented over the house shown in the region of the image presented on the display of the device, in accordance with an example embodiment of the present invention described herein;

FIG. 7 illustrates the device shown in FIG. 3 with a text box being presented over the image, wherein the text box includes guidance for locating a region of the image, in accordance with an example embodiment of the present invention described herein;

FIG. 8 illustrates the device shown in FIG. 3, wherein multiple regions of the image are outlined and multiple icons are presented over the image, in accordance with an example embodiment of the present invention described herein;

FIG. 9 illustrates the device shown in FIG. 3, wherein another region of the image is outlined, in accordance with an example embodiment of the present invention described herein;

FIG. 10 illustrates the device shown in FIG. 9, wherein the region of the image has been enlarged and a user is providing input directed to a tower within the region, in accordance with an example embodiment of the present invention described herein;

FIG. 11 illustrates the device shown in FIG. 10, wherein the user is providing input directed to another tower within the region, in accordance with an example embodiment of the present invention described herein;

FIG. 12 illustrates the device shown in FIG. 9, wherein yet another region of the image is outlined, in accordance with an example embodiment of the present invention described herein;

FIG. 13 illustrates the device shown in FIG. 12, wherein the region of the image has been enlarged and the user is providing input directed to yet another tower within the region, in accordance with an example embodiment of the present invention described herein;

FIG. 14 illustrates a flowchart according to an example method for hiding access to information in an image, in accordance with an example embodiment of the present invention described herein; and FIG. 15 illustrates a flowchart according to another example method for hiding access to information in an image, in accordance with an example embodiment of the present invention described herein.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to singular or plural data capable of being transmitted, received, displayed and/or stored in accordance with various example embodiments. Thus, use of any such terms should not be taken to limit the spirit and scope of the disclosure.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of an apparatus 102 configured for hiding access to information in an image according to an example embodiment. It will be appreciated that the apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an apparatus for performing operations and operational routing, other configurations may also be used to implement embodiments of the present invention.

The apparatus 102 may be embodied as either a fixed device or a mobile device such as a desktop computer, laptop computer, mobile terminal, mobile computer, mobile phone, mobile communication device, game device, digital camera/camcorder, audio/video player, television device, radio receiver, digital video recorder, positioning device, a chipset, a computing device comprising a chipset, any combination thereof, and/or the like. In this regard, the apparatus 102 may comprise any computing device that comprises or is in operative communication with a user interface (e.g., a touch display capable of displaying a graphical user interface). In some example embodiments, the apparatus 102 is embodied as a mobile computing device, such as the mobile terminal illustrated in FIG. 2.

In this regard, FIG. 2 illustrates a block diagram of a mobile terminal 10 representative of one example embodiment of an apparatus 102. It should be understood, however, that the mobile terminal 10 illustrated and hereinafter described is merely illustrative of one type of apparatus 102 that may implement and/or benefit from various example embodiments of the invention and, therefore, should not be taken to limit the scope of the disclosure. While several embodiments of the electronic device are illustrated and will be hereinafter described for purposes of example, other types of electronic devices, such as mobile telephones, mobile computers, personal digital assistants (PDAs), pagers, laptop computers, desktop computers, gaming devices, positioning devices, tablet computers, televisions, e-papers, and other types of electronic systems, may comprise various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of communicating according to Wi-Fi, Near Field Communications (NFC), BlueTooth, Worldwide Interoperability for Microwave Access (WiMAX) or other proximity-based communications protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The display 28 of the mobile terminal may be of any type appropriate for the electronic device in question with some examples including a plasma display panel (PDP), a liquid crystal display (LCD), a light-emitting diode (LED), an organic light-emitting diode display (OLED), a projector, a holographic display or the like. The display 28 may, for example, comprise a three-dimensional touch display, examples of which will be described further herein below. The user input interface may comprise devices allowing the mobile terminal to receive data, such as a keypad 30, a touch display (e.g., some example embodiments wherein the display 28 is configured as a touch display), a joystick (not shown), and/or other input device. In embodiments including a keypad, the keypad may comprise numeric (0-9) and related keys (#, *), and/or other keys for operating the mobile terminal 10. Alternatively or additionally, the keypad 30 may include a conventional QWERTY keypad arrangement.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the apparatus 102 includes various means for performing the various functions herein described. These means may comprise one or more of a processor 110, memory 112, communication interface 114, user interface 116, or user interface (UI) control circuitry 122. The means of the apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, and/or UI control circuitry 122 may be embodied as a chip or chip set. The apparatus 102 may therefore, in some cases, be configured to or may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC or FPGA, one or more other types of hardware processors, or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In embodiments wherein the apparatus 102 is embodied as a mobile terminal 10, the processor 110 may be embodied as or comprise the processor 20 (shown in FIG. 2). In some example embodiments, the processor 110 is configured to execute instructions stored in the memory 112 or otherwise accessible to the processor 110. These instructions, when executed by the processor 110, may cause the apparatus 102 to perform one or more of the functionalities of the apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the apparatus 102 is embodied as a mobile terminal 10, the memory 112 may comprise the volatile memory 40 and/or the non-volatile memory 42 (shown in FIG. 2). The memory 112 may be configured to store information, data, applications, instructions, or the like for enabling the apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. The stored information may include, for example, images, content, media content, user data, application data, and/or the like. This stored information may be stored and/or used by the UI control circuitry 122 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In some example embodiments, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. In embodiments wherein the apparatus 102 is embodied as a mobile terminal 10, the communication interface 114 may be embodied as or comprise the transmitter 14 and receiver 16 (shown in FIG. 2). The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the apparatus 102 and one or more computing devices may be in communication. As an example, the communication interface 114 may be configured to receive and/or otherwise access content (e.g., web page content, streaming media content, and/or the like) over a network from a server or other content source. Additionally or alternatively, the communication interface 114 may be configured to support communications in accordance with any proximity-based protocol including, for example, Wi-Fi, NFC, BlueTooth, WiMAX or the like. The communication interface 114 may additionally be in communication with the memory 112, user interface 116, and/or UI control circuitry 122, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touchscreen display, a microphone, a speaker, and/or other input/output mechanisms. In some embodiments, a display may refer to display on a screen, on a wall, on glasses (e.g., near-eye-display), in the air, etc. In embodiments wherein the apparatus 102 is embodied as a mobile terminal 10, the user interface 116 may be embodied as or comprise the display 28 and keypad 30 (shown in FIG. 2). The user interface 116 may be in communication with the memory 112, communication interface 114, and/or UI control circuitry 122, such as via a bus.

The UI control circuitry 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In some example embodiments wherein the UI control circuitry 122 is embodied separately from the processor 110, the UI control circuitry 122 may be in communication with the processor 110. The UI control circuitry 122 may further be in communication with one or more of the memory 112, communication interface 114, or user interface 116, such as via a bus.

The UI control circuitry 122 may be configured to receive user input from a user interface 116, such as a touch display (e.g., touchscreen). The user input or signal may carry positional information indicative of the user input. In this regard, the position may comprise a position of the user input in a two-dimensional space, which may be relative to the surface of the touch display user interface. For example, the position may comprise a coordinate position relative to a two-dimensional coordinate system (e.g., an X and Y axis), such that the position may be determined. Accordingly, the UI control circuitry 122 may determine a position of the user input such as for determining a portion of the display to which the user input correlates.

The touch display may also be configured to enable the detection of a hovering gesture input. A hovering gesture input may comprise a gesture input to the touch display without making physical contact with a surface of the touch display, such as a gesture made in a space some distance above/in front of the surface of the touch display. As an example, the touch display may comprise a capacitive touch display, which may be configured to enable detection of capacitance of a finger or other input object by which a gesture may be made without physically contacting a display surface. As another example, the touch display may be configured to enable detection of a hovering gesture input through use of acoustic wave touch sensor technology, electromagnetic touch sensing technology, near field imaging technology, optical sensing technology, infrared proximity sensing technology, some combination thereof, or the like.

As noted above, the apparatus 102 (shown in FIG. 1) may be configured to perform a variety of operations. For example, in some embodiments, the apparatus 102 may be configured to launch an application (e.g., email, messaging, etc.) or open information (e.g., documents, videos, images, etc.). In some embodiments, apparatus 102 causes a user-selectable graphical element to be presented on a display which is associated with one or more programs or files. For example, the user-selectable graphical element may be associated with information in some embodiments or be associated with an application in some other embodiments. In some such embodiments, the selection of a user-selectable graphical element by a user providing appropriate input detected by apparatus 102 triggers the execution of one or more program or files, so as to cause the display of information associated with the user-selected graphical element and/or the launch of an associated application. In other embodiments, suitable processing means, such as processor(s) 110, may automatically trigger the execution of one or more programs or files, for example to launch an application or show information, when one or more conditions are met. In some cases, some of the applications and/or information may be sensitive, such that it may be desirable to restrict access to the application and/or information. In some embodiments, the apparatus 102 may be configured to impose constraints on the conditions under which processor means (such as processor(s) 110, 20) may cause an application to be launched and/or information displayed. For example, the apparatus 102 may be configured to conceal the user-selectable element associated with a file or program, the selection of which is necessary to access to the file or program.

Additionally, in some embodiments, the apparatus 102 may be configured to cause presentation of an image on a display. For example, FIG. 3 illustrates an example device 200 (such as may include as a component or embody apparatus 102). The device 200 may include a display 208 on which an image is caused to be displayed. The image may comprise a number of graphical elements or regions, one or more of which may be associated with the execution of one or more programs or files. For example, an image may contain one or more user-selectable graphical elements or graphical regions, such that, for example, when user input is detected selecting a graphical region or element in the image, the associated one or more programs and/or files are caused to be executed, for example by processing means such as processor 110. In some embodiments, an image may also contain one or more regions or elements which are associated with certain files and/or programs, which are automatically caused to be executed, for example by processor 110, if one or more conditions associated with the one or more regions or elements are met.

In some embodiments, apparatus 102 may be configured to restrict access to one or more files or programs which are capable of being accessed by activating graphical elements and/or regions in an image, such as by concealing the graphical elements and/or regions in the image. In some examples of embodiments of the invention, one or more graphical elements and/or regions associated with one or more files and/or programs may be concealed in an image by the displayed size of a graphical element or region relative to the displayed size of the image and/or by not being distinguishable from other graphical elements or graphical regions which are not activatable, i.e., which are not associated with a file or program. For example, a graphical element or region may comprise an element or region forming part of the image content, such as an eye of a face in an image of a crowd of people, or a building in a town in an image of a valley. Concealment is provided by the image via which the files and/or programs and/or applications are activated being of sufficiently high resolution for the graphical elements and/or regions within the image to not occupy a sufficient area in the image displayed (or sufficient area relative to the area of the displayed image) such that they are inherently either not visible to the average human eye and/or if visible, are not distinguishable in the image as being activatable, and/or if distinguishable and capable of potentially being activatable, one or more other additional condition(s) must be met.

For example, in the depicted embodiment of FIG. 3, an image 210 of hills with trees, houses, and buildings is presented on the display 208.

Some example embodiments of the present invention relate to restricting access to information and/or one or more applications within an image. Indeed, some images may be dense and require a large amount of pixels for presentation. In some embodiments of the present invention, a dense image may be an image with a sufficiently high-level of resolution to be presented in a highly compressed display form at a given display resolution such that some graphical elements of the image are not initially visible and/or may be concealed within the detail of other graphical elements. In this regard, the image may have such a high level of resolution that magnifying a portion of the image may reveal graphical elements that were not previously visible (or discernable) by the user. For example, in some embodiments, an image with at least 100 mega-pixels may be considered a dense image. Some example embodiments of the present invention may be used with even more dense of an image (e.g., at least 500 mega-pixels, at least 1,000 mega-pixels, etc.).

As such, some embodiments of the present invention may hide information and/or access to applications or information within the image. In this regard, the user must know where within the large image to look and/or zoom in to in order to launch the application or open the information. In some embodiments, a user may need to magnify (e.g., zoom in on) a certain location or region within an image in order to be able to launch the sensitive application or open the sensitive information. However, that location or region may not be readily apparent to someone looking at the image on the display. In such a manner, the person looking at the image may not actually know that it is even possible to launch the sensitive application or open the sensitive information from the image.

For example, with reference to FIG. 3, the ability to access sensitive information (e.g., launch an application or open information) is present within the region 220 outlined on the image 210. However, the user looking at the image 210 may not know that access to the sensitive information may be obtained through region 220. Indeed, the user may not even know that access to sensitive information is even available. It should be noted that, in some embodiments, the image 210 does not include the outlining around the region 220 (e.g., the device 200 does not actually present the outlining around the region 220). In such a regard, the outlining shown in FIGS. 3, 8, 9, and 12 is meant for illustration purposes. However, in some embodiments, the outlining may be presented, such as to aid a user in locating the region for accessing the sensitive information.

Additionally, in some embodiments, the user may be required to magnify (e.g., zoom in on) the region in order to gain access to the sensitive information. As such, in some embodiments, the apparatus 102, such as through the processor 110 and/or user interface 116, may be configured to receive user input indicating a desire of a user to magnify a region within an image presented on a display. In some embodiments, the user input may define a level of magnification. The level of magnification may be representative of how enlarged the user wants the indicated region to become. For example, a user input may provide a zoom in gesture (e.g., a reverse pinch) to the region. The zoom in gesture may have a degree associated with it, such as how far the user's fingers are spread apart while performing the gesture. In some embodiments, the user may provide multiple (e.g., repeated) user inputs indicating a desire to magnify a region of an image. In this regard, as will be described in greater detail herein, the user need not be limited to one zoom in gesture for gaining access to restricted applications and/or information and may, for example, provide repeated zoom in gestures until the level of magnification threshold is satisfied for a particular region and application/information.

In some embodiments, the apparatus 102, such as through the processor 110 and/or user interface 116, may be configured to cause the region within the image to be magnified (e.g., enlarged) to the level of magnification. In such a regard, the apparatus 102, such as through the processor 110, may be configured to determine the level of magnification and the region indicated by the user input and apply the enlargement to the image accordingly. For example, a user may apply a zoom in gesture (e.g., user input) to region 220 within image 210 shown in FIG. 3. Then, in response, with reference to FIG. 4, the device 200 may present the region 220 magnified to the level of magnification indicated by the user input.

In some embodiments, the apparatus 102, such as through the processor 110, may be configured to determine whether the region is associated with at least one application or information. In such a regard, a region within an image may be associated with one or more applications and/or information such that a user may gain access to the associated application or information from the region.

In some embodiments, the region may be defined by any number of factors. In some embodiments, the region may be any size area of the image that is centered on a predetermined center location (e.g., the specific location that a user needs to provide user input to in order to access to the application and/or information, any object of the image within the region, any point of the image within the region, etc.). Additionally or alternatively, the region may be defined by a certain size or range of size, such as may be associated with the level of magnification threshold described herein.

In some embodiments, the apparatus 102, such as through the processor 110, may be configured to determine whether the level of magnification satisfies a level of magnification threshold. In some embodiments, even though the region may be associated with an application or information, the level of magnification of the region may have to satisfy a level of magnification threshold to enable access to the application or information. In such a manner, an additional layer of security is provided.

In some embodiments, the apparatus 102, such as through the processor 110, may be configured to determine whether the level of magnification satisfies the level of magnification threshold by determining whether a graphical element within the region defines a size that occupies a predetermined area of the display. In such a regard, in some embodiments, the region may define at least one graphical element (e.g., a graphical element associated with access to one or more applications and/or information). In some cases, the level of magnification threshold may be satisfied when the graphical element is magnified to a size that enables it to be visible or discernable by a user. For example, in some embodiments the graphical element may need to define a size that is at least a certain percentage of the screen space of the display (e.g., 5%, 10%, etc.). Similarly, the graphical element may need to define a predetermined size (e.g., 1 in.×1 in., 2 cm by 1 cm, etc.). Further, in some embodiments, the predetermined size and/or percentage of the screen space may correspond to the ability of a user to discern the graphical element. For example, if the apparatus 102 is configured to automatically launch the associated application or open the associated information (as provided in greater detail herein), the application associated with a tree-top within an image may be automatically launched when the user magnifies the tree-top to occupy, for example, between 50% and 75% of the available screen space of the display. In another example, the level of magnification threshold may be satisfied when the tree-top is magnified to a size that is around 1 cm tall on a display.

Along similar lines, in some embodiments, the apparatus 102, such as through the processor 110, may be configured to determine whether the level of magnification satisfies the level of magnification threshold by determining whether a graphical element (e.g., an icon or an object within the image) defines a size that satisfies a predetermined size such that it is selectable by the user. For example, in some embodiments the graphical element may need to define a size that enables it to be selected by a user (e.g., to facilitate access to the applications and/or information). In some embodiments, the level of magnification may be determined by the relative size of the graphical element to an input element, such that the graphical element can be selectable (i.e., using someone's finger, the graphical element may need to be sufficiently magnified for the user to select it individually). In some embodiments, as noted in greater detail herein, if the region of the image is magnified to become 80% of the display, the application may not be launched, as the input, the finger-tip in this example, might then be too small relative to the graphical element. In some embodiments, the range for the graphical element to be selectable may be dependent on the graphical element area falling within, say 10% of the area of the input element.

In some embodiments, the level of magnification may be a zoom level, such as a level at which the image is zoomed in. In this regard, the zoom level may be relative to the initial image resolution, the size of the display, and/or the area the presentation of the image occupies on the display. For example, if a particular tree-top functions as an icon which is concealed in a highly detailed large image of a forest, a user needs to know where and into which tree they must zoom in the image. When the tree-top is visible such that it can be selected (as in some embodiments), the image may have been zoomed-in to magnify the original image by 50 times (e.g., the zoom level may be 50 times the original image zoom level). However, the same image, when viewed on a different display or enlarged on the same display, may need only be zoomed-in to magnify the image by 25 times (e.g., the zoom level may be 25 times the original image zoom level). Likewise, the same image, but on a different display or diminished on the same display, may need to be zoomed-in to magnify the image by 100 times (e.g., the zoom level may be 100 times the original image zoom level). In this regard, in some embodiments, the tree-top icon (e.g., the graphical element) may need to occupy a sufficiently large area on the display to enable the icon to be selectable. As such, the desired "zoom level" threshold for the image need not be an absolute zoom level, but may be dependent on the size the initial image and the display. Though the above described embodiments define example zoom levels of 25 times, 50 times, or 100 times, other zoom levels are contemplated by some embodiments of the present invention (e.g., 2 times, 20 times, 200 times, etc.).

In some embodiments, the level of magnification threshold may define a range of levels of magnification such that the level of magnification satisfies the level of magnification threshold in an instance in which the level of magnification is above a minimum level of magnification threshold and below a maximum level of magnification threshold. For example, in some embodiments, if the region is not magnified enough or magnified too much, the associated application and/or information may not be accessible by the user.

In some embodiments, the apparatus 102, such as through the processor 110, may be configured to cause the at least one application to be launched or information to be opened in an instance in which the region is associated with the at least one application or information and the level of magnification satisfies the level of magnification threshold. Thus, in some embodiments, the region within the image must be associated with an application or information and the level of magnification must satisfy the level of magnification threshold in order for the user to access the application or information.

In some embodiments, the apparatus 102, such as through the processor 110, may be configured to automatically cause the at least one application to be launched or information to be opened in an instance in which the region is associated with the at least one application or information and the level of magnification satisfies the level of magnification threshold. For example, in some embodiments, applying a level of magnification that satisfies the level of magnification threshold to a particular region may automatically cause the associated application to launch or information to open. In this regard, a user may merely zoom in to the proper level of magnification on a region and the associated application will automatically launch or the associated information will automatically open. For example, with reference to FIG. 3, if the user applies a zoom in gesture to region 220 in image 210, then upon enlargement of region 220 to a level of magnification that satisfies the level of magnification threshold (e.g., shown in FIG. 4) the associated application may automatically launch and/or the associated information may automatically open.

In some embodiments, even though the level of magnification satisfies the level of magnification threshold, the user may be required to apply a second user input directed to a specific location within the region in order to launch the application and/or open the information. In such a regard, in some embodiments, the apparatus 102, such as through the processor 110 and/or user interface 116, may be configured to receive a second user input indicating a location within the region after causing the region of the image to be enlarged to the level of magnification. For example, with reference to FIG. 5, the device 200 has presented the enlarged view of the region 220 from the image 210 (shown in FIG. 3). The user 235 may now apply a second user input directed to the house 225 (e.g., by performing a touch gesture with their finger 237).

Additionally, in some embodiments, the apparatus 102, such as through the processor 110, may be configured to determine whether the location within the region is associated with at least one of an application or information. In such a regard, a specific location within region (which is within an image) may be associated with one or more applications and/or information such that a user may gain access to the associated application or information from the location.

Further, in some embodiments, the apparatus 102, such as through the processor 110, may be configured to cause the at least one application to be launched or information to be opened in an instance in which (i) the region is associated with the at least one application or information; (ii) the level of magnification satisfies the level of magnification threshold; and (iii) the location within the region is associated with the at least one application or information. In such a manner, a further layer of security is added for allowing access to the application and/or information. Indeed, in some embodiments, the user must properly zoom in on the specific region and then the user must also apply a second user input to a specific location within the region itself in order to launch the application or open the information.

In some embodiments, the location may be just an object of the image (e.g., a part of the image itself). For example, the location within the region indicated by the second user input may be an object within the image at the location (e.g., tree, house, building, car, hill, etc.). In such a regard, in some embodiments, the object may be associated with the at least one application or information such that providing user input to the object will enable access to the application or information. For example, as shown in FIG. 5, the object at the location is a house 225 that is a part of the overall image 210 (shown in FIG. 3) such that it does not stand out from the remainder of the image 210.

Alternatively, in some embodiments, the location may include an icon presented over the image at the location. In such a regard, in some embodiments, the icon may be associated with the at least one application or information such that providing user input to the icon will enable access to the application or information. For example, as shown in FIG. 6, an icon 228 with the title "DOC" 229 is presented over the image 210 at the location. Such an embodiment provides a clue to the user as to where the second user input is needed and also may provide a clue as to what application and/or information may be accessed from the location. In some embodiments, the icon may be so small compared to the overall image that the icon is not discernable when the image is zoomed out (e.g., at the default level of magnification which corresponds to the image being presented so as to fit to the size of the display).

As detailed herein, some embodiments of the present invention seek to hide access to sensitive information within an image. By hiding the application or information within the detailed image, a user may not know where to look for the ability to access the application or information, especially if no label is initially perceivable. In such a regard, some embodiments of the present invention use images with a large number of pixels, such as at least 100,000,000 pixels, and ideally at least 1,000,000,0000 (i.e., 1 billion) pixels. Such a detailed image allows for ease of burying applications and/or information somewhere within the image, creating somewhat of a needle in a haystack scenario. However, the anticipated size of display and the pixel size will to some extent determine the suitability of a particular data size of image for the purposes of the invention. Indeed, use of such a detailed image increases the security of the application or information.

Some embodiments of the present invention may provide guidance for the user to help locate the region within the image to allow access to the application and/or information. In some embodiments, such guidance may provide hints, but not compromise the security of the application and/or information. In some embodiments, the apparatus 102, such as through the processor 110 and/or user interface 116, may be configured to cause guidance to be provided to the user for finding the region of the image associated with the at least one application or information.

For example, with reference to FIG. 7, the device 200 may present the image 210 on the display 208. However, the device 200 may also present a prompt providing contextual guidance to an activatable element of the image in the form of instructions 240 to the user for locating the region (e.g., region 220 shown in FIG. 3). In the depicted example of an embodiment, the prompt takes the form of instructions 240 which offer a contextual challenge, the answer to the challenge being likely to be personal to the user and/or to provide a hint to guide a user to locate one or more activatable elements in the image. In this example, the hint takes the form "Zoom In On Your Aunt's House." In such a situation, the prompt provides useful information if a user understands from the context of the prompt where they need to look in the image to perceive the activatable element. For example, in one instance, user A who has set up the hint, may be guided by a contextual challenge such as to zoom in on their aunt's house, which may be the house 225 shown in FIG. 5. A user who is not aware of user A's aunt's house, may not know where to enlarge the image, and accordingly may enlarge the wrong portion of the image, which may result in the activatable element not becoming perceivable and/or selectable. Thus, depending on the configuration of the security for accessing the application and/or information associated with the region 220, the application may launch or the information may open automatically upon the user zooming in or the application may launch or the information may open in response to the user performing additional user input (e.g., selecting the house 225).

Though the depicted embodiment shows guidance in the form of textual instructions, some embodiments of the present invention contemplate other types of guidance (e.g., arrows, highlighting, riddles, etc.).

Some embodiments of the present invention contemplate use of an image as a home screen that enables access to multiple applications and/or information. In such a regard, the image used for the home screen may comprise multiple defined regions within the image, each region being associated with different applications and/or information. As noted above, in some embodiments, the region may be defined by any number of factors. In some embodiments, the region may be any portion of the image that is centered on a predetermined center location (e.g., the specific location that a user needs to provide user input to in order to access to the application and/or information, any object of the image within the region, any point of the image within the region, etc.). Additionally or alternatively, the region may be defined by a certain size or range of size, such as may be associated with the level of magnification threshold described herein. In such a regard, multiple regions can be defined within the image.

Moreover, in some embodiments, different regions may each be associated with a different level of magnification threshold. As such, in some embodiments, the apparatus 102, such as through the processor 110 and/or user interface 116, may be configured to cause the image to be presented on the display such that the image defines a plurality of regions. Each region may be associated with at least one different application or information. Further, at least two different regions may be associated with different level of magnification thresholds. Further, in some embodiments, one or more the regions may define a specific location that a user must provide user input to in order to access the application or information once the level of magnification for the region satisfies the level of magnification threshold.

For example, with reference to FIG. 8, the device 200 may present an image 250 as a home screen. As such, the image 250 may define multiple regions (e.g., region 220, region 260, region 262, and region 264) that may each be associated with different applications or information and corresponding level of magnification thresholds that must be satisfied to enable access to the corresponding application or information. In the depicted embodiment, region 220 may be associated with at least one application or information. Further, region 220 may be associated with a specific level of magnification threshold that must be a satisfied to enable access to the application or information. In contrast, region 264 may be associated with a different application or information and may be associated with a different level of magnification threshold that must be satisfied to enable access to the application or information. This difference in level of magnification threshold is represented in FIG. 8 by the different size of highlighted outline for each of region 220 and 264. Likewise, regions 260 and 262 may also have corresponding applications and/or information and level of magnification thresholds.

In some embodiments, at least one region may be located within another region, but define different level of magnification thresholds. In such a regard, a user may enlarge the first region to a level of magnification that satisfies the level of magnification threshold for the first region, but does not satisfy the level of magnification threshold for the second region. In such a situation, the application and/or information for the first region may be accessible, but the application and/or information for the second region may not be accessible. For example, with reference to FIG. 8, a user may enlarge region 260 to a level of magnification that satisfies the level of magnification threshold for the application or information associated with region 260. However, even though region 262 has also been enlarged, the level of magnification may not satisfy the level of magnification threshold for region 262 and, thus, the application or information associated with region 262 may not be accessible. As a further example, a user may enlarge region 260 and may be able to gain access to a first document, such as by providing a second user input directed to the large tower. However, in order to access the second document associated with region 262, the user may need to further enlarge region 262 and then, perhaps, provide user input directed to a specific window within the large tower.

Further, in some embodiments, the home screen may have applications or information that are accessible from the default level of magnification (e.g., the image is presented so as to fit to the size of the display). This is similar to a typical home screen. Further, however, the image may have regions with hidden access to sensitive applications or documents (e.g., as described in embodiments presented herein). For example, with reference to FIG. 8, the device 200 may present icons (e.g., "PHONE" icon 252 and "EMAIL icon 254) over a portion of the image 250 defining the home screen. These icons may be available for access at the default level of magnification for the image 250 (e.g., as shown in FIG. 8). However, a user may zoom into other regions (e.g., region 220, region 260, region 262, and region 264) in order to access other applications or information.

Some embodiments of the present invention contemplate use of further security measures to protect access to sensitive applications or information. In some embodiments, a specific sequence of user inputs may be required to enable access to an application or information. Along these lines, in some embodiments, a user may enlarge a region to a level of magnification that satisfies the level of magnification threshold and then may be required to provide subsequent user inputs directed to a sequence of different specific locations within the region in order to access the application or information associated with the region. Indeed, after receiving the sequence of user inputs, in some embodiments, the apparatus 102, such as through the processor 110, may be configured to determine whether the sequence of user inputs provided by the user satisfies a sequence associated with the at least one application or information. Further, in some embodiments, the apparatus 102, such as through the processor 110, may be configured to cause the at least one application to be launched or information to be opened in an instance in which receiving the sequence of user inputs provided by the user satisfies the sequence associated with the at least one application or information. In such a manner, yet another layer of security is added for allowing access to the application and/or information. Indeed, in some embodiments, the user must properly zoom in on the specific region and then the user must also apply a sequence of user inputs directed to different specific locations within the region itself in order to launch the application or open the information.

For example, with reference to FIG. 9, the device 200 may present an image 210 on a display 208. The image 210 may define a region 270 associated with at least one application or information. The user may provide a zoom in gesture (e.g., a first user input) to region 270 to enlarge the region 270 to a level of magnification that satisfies the level of magnification threshold for the region 270 (shown in FIG. 10). Then, as illustrated in FIG. 10, the user 235 may provide a second user input (e.g., a pointing gesture with their finger 237) directed to the first tower 272. Then, with reference to FIG. 11, the user 235 may provide a third user input to a second tower 274 that is within the same region 270. The device 200 may determine that the sequence of user inputs (e.g., the second user input directed to the first tower 272 followed by the third user input directed to the second tower 274) satisfies the sequence of user inputs associated with the at least one application or information and, thus, launch the application or open the information.

In some embodiments, the sequence may be even more robust and require the user to zoom out of the first region and into a second region and, in some cases, provide another user input to a specific location within the region. Thus, the sequence necessary to access sensitive information may be made up of any number of combinations of any type of described inputs defined herein (e.g., inputs to specific locations within a different region, enlarging a different region to a level of magnification that satisfies the corresponding level of magnification threshold, etc.). For example, with reference to FIG. 11, after the user 235 provides the third user input directed to the second tower 274 within region 270, the user may need to still perform further input in the sequence in order to access the application or information. Thus, with reference to FIG. 12, the user may zoom back out to the image 210. Then, the user may provide another zoom in gesture to region 275 to enlarge the region 275 to a level of magnification that satisfies the level of magnification threshold for the region 275 (shown in FIG. 13). Next, as illustrated in FIG. 13, the user 235 may provide a fourth user input (e.g., a pointing gesture with their finger 237) directed to a third tower 276. The device 200 may determine that the sequence of user inputs (e.g., the second user input directed to the first tower 272 within region 270; followed by the third user input directed to the second tower 274 within region 270; and followed further by the fourth user input directed to the third tower 276 within region 275) satisfies the sequence of user inputs associated with the at least one application or information and, thus, launch the application or open the information.

Though the above described embodiments contemplate additional user inputs or a specific sequence of user inputs in order to access the application or information, other security features are also contemplated. For example, in some embodiments, a user may be required to maintain a certain duration of the user input (e.g., 2 seconds, 10 seconds, etc.) in order to access the application or information.

Some embodiments of the present invention contemplate enabling a user to setup (e.g., configure) access to applications and/or information within an image, such as according to any embodiments described herein. In some embodiments, a user may configure which applications and/or information have access hidden within an image. Further, in some embodiments, the user may define the level of security and the corresponding characteristics for gaining access to the application and/or information (e.g., which region of the image, the level of magnification threshold, the predetermined centered location of the region, the specific location within the region, the icon presented over the specific location, etc.). As such, some embodiments of the present invention contemplate a user configurable interface for hiding access to information within an image.

Embodiments of the present invention provide methods, apparatus and computer program products for hiding access to information in an image. Various examples of the operations performed in accordance with embodiments of the present invention will now be provided with reference to FIGS. 14-15.

FIG. 14 illustrates a flowchart according to an example method for hiding access to information in an image according to an example embodiment 300. The operations illustrated in and described with respect to FIG. 14 may, for example, be performed by, with the assistance of, and/or under the control of one or more of the processor 110, memory 112, communication interface 114, user interface 116, or UI control circuitry 122 (shown in FIG. 1). Operation 302 may comprise receiving user input indicating a desire of a user to magnify a region within an image presented on a display to a level of magnification. The processor 110, user interface 116, and/or UI control circuitry 122 may, for example, provide means for performing operation 302. Operation 304 may comprise causing the region within the image to be magnified to the level of magnification. The processor 110, user interface 116, and/or UI control circuitry 122 may, for example, provide means for performing operation 304. Operation 306 may comprise determining whether the region is associated with at least one of an application or information. The processor 110 may, for example, provide means for performing operation 306. Operation 308 may comprise determining whether the level of magnification satisfies a level of magnification threshold. The processor 110 may, for example, provide means for performing operation 308. Operation 310 may comprise causing the at least one application to be launched or information to be opened in an instance in which the region is associated with the at least one of an application or information and the level of magnification satisfies the level of magnification threshold. The processor 110, user interface 116, and/or UI control circuitry 122 may, for example, provide means for performing operation 310.

FIG. 15 illustrates a flowchart according to another example method for hiding access to information in an image according to an example embodiment 400. The operations illustrated in and described with respect to FIG. 15 may, for example, be performed by, with the assistance of, and/or under the control of one or more of the processor 110, memory 112, communication interface 114, user interface 116, or UI control circuitry 122 (shown in FIG. 1). Operation 402 may comprise receiving user input indicating a desire of a user to magnify a region within an image presented on a display to a level of magnification. The processor 110, user interface 116, and/or UI control circuitry 122 may, for example, provide means for performing operation 402. Operation 404 may comprise causing the region within the image to be magnified to the level of magnification. The processor 110, user interface 116, and/or UI control circuitry 122 may, for example, provide means for performing operation 404. Operation 405 may comprise receiving a second user input indicating a location within the region after causing the region of the image to be magnified to the level of magnification. The processor 110, user interface 116, and/or UI control circuitry 122 may, for example, provide means for performing operation 405.

Operation 406 may comprise determining whether the region is associated with at least one of an application or information. The processor 110 may, for example, provide means for performing operation 406. Operation 408 may comprise determining whether the level of magnification satisfies a level of magnification threshold. The processor 110 may, for example, provide means for performing operation 408. Operation 409 may comprise determining whether the location within the region is associated with at least one of an application or information. The processor 110 may, for example, provide means for performing operation 409. Operation 410 may comprise causing the at least one application to be launched or information to be opened in an instance in which (i) the region is associated with the at least one of an application or information, (ii) the level of magnification satisfies the level of magnification threshold, and (iii) the location within the region is associated with the at least one application or information. The processor 110, user interface 116, and/or UI control circuitry 122 may, for example, provide means for performing operation 410.

FIGS. 14-15 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of an example embodiment of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contem-

What is claimed is:

1. A method comprising:
receiving user input indicating a desire of a user to magnify a region within an image presented on a display to a level of magnification;
causing the region within the image to be magnified to the level of magnification;
determining whether the region corresponds to at least one of an application or information;
determining whether the level of magnification satisfies a level of magnification threshold;
causing the at least one application to be launched or information to be accessed in an instance in which the region corresponds to the at least one of an application or information and the level of magnification satisfies the level of magnification threshold; and
receiving a second user input indicating a location within the region after causing the region of the image to be magnified to the level of magnification;
wherein the location within the region indicated by the second user input comprises an icon presented over the image at the location such that the icon corresponds to the at least one application or information;
wherein determining whether the level of magnification satisfies the level of magnification threshold comprises determining whether a size of the icon within the region satisfies a predetermined size such that the icon is selectable by a user.

2. The method according to claim 1, wherein determining whether the level of magnification satisfies the level of magnification threshold comprises determining whether a graphical element within the region defines a size that occupies a predetermined area of the display.

3. The method according to claim 1 further comprising:
determining whether the location within the region corresponds to at least one of an application or information;
wherein causing the at least one application to be launched or information to be accessed comprises causing the at least one application to be launched or information to be accessed in an instance in which (i) the region corresponds to the at least one of an application or information, (ii) the level of magnification satisfies the level of magnification threshold, and (iii) the location within the region corresponds to the at least one application or information.

4. The method according to claim 3 further comprising: receiving a third user input indicating a second location within the image; determining whether receiving the third user input indicating the second location after receiving the second user input indicating the first location satisfies a sequence corresponding to the at least one application or information; and wherein causing the at least one application to be launched or information to be accessed comprises causing the at least one application to be launched or information to be accessed in an instance in which receiving the third user input indicating the second location after receiving the second user input indicating the first location satisfies the sequence corresponding to the at least one application or information.

5. The method according to claim 1 further comprising: causing the image to be presented on the display of a device, wherein the image defines a plurality of regions, wherein each region corresponds to at least one different application or information, and wherein at least two different regions each correspond to a different level of magnification threshold.

6. An apparatus comprising a processor and a memory including computer program code, the memory and the computer program code configured to, with the processor, cause the apparatus to:
receive user input indicating a desire of a user to magnify a region within an image presented on a display to a level of magnification;
cause the region within the image to be magnified to the level of magnification;
determine whether the region corresponds to at least one of an application or information;
determine whether the level of magnification satisfies a level of magnification threshold;
cause the at least one application to be launched or information to be accessed in an instance in which the region corresponds to the at least one of an application or information and the level of magnification satisfies the level of magnification threshold; and
receive a second user input indicating a location within the region after causing the region of the image to be magnified to the level of magnification;
wherein the location within the region indicated by the second user input comprises an icon presented over the image at the location such that the icon corresponds to the at least one application or information; and
wherein the memory and the computer program code are further configured to, with the processor, cause the apparatus to determine whether the level of magnification satisfies the level of magnification threshold by determining whether a size of the icon within the region satisfies a predetermined size such that the icon is selectable by a user.

7. The apparatus of claim 6, wherein the memory and the computer program code are further configured to, with the processor, cause the apparatus to determine whether the level of magnification satisfies the level of magnification threshold by determining whether a graphical element within the region defines a size that occupies a predetermined area of the display.

8. The apparatus according to claim 6, wherein the memory and the computer program code are further configured to, with the processor, cause the apparatus to:
determine whether the location within the region corresponds to at least one of an application or information; and
cause the at least one application to be launched or information to be accessed by causing the at least one application to be launched or information to be accessed in an instance in which (i) the region corresponds to the at least one of an application or information, (ii) the level of magnification satisfies the level of magnification threshold, and (iii) the location within the region corresponds to the at least one application or information.

9. The apparatus according to claim 8, wherein the memory and the computer program code are further configured to, with the processor, cause the apparatus to:
receive a third user input indicating a second location within the image;
determine whether receiving the third user input indicating the second location after receiving the second user input indicating the first location satisfies a sequence corresponding to the at least one application or information; and cause the at least one application to be launched or information to be accessed by causing the at least one application to be launched or information to be accessed in an instance in which receiving the third user input indicating the second location after receiving the second user input indicating the first location satisfies the sequence corresponding to the at least one application or information.

10. The apparatus according claim 6, wherein the memory and the computer program code are further configured to, with the processor, cause the apparatus to cause the image to be presented on the display of a device, wherein the image defines a plurality of regions, wherein each region corresponds to at least one different application or information, and wherein at least two different regions each correspond to a different level of magnification threshold.

11. A non-transitory computer readable medium having program code portions stored thereon, the program code portions being configured, upon execution, to:
receive user input indicating a desire of a user to magnify a region within an image presented on a display to a level of magnification;
cause the region within the image to be magnified to the level of magnification;
determine whether the region corresponds to at least one of an application or information;
determine whether the level of magnification satisfies a level of magnification threshold;
cause the at least one application to be launched or information to be accessed in an instance in which the region corresponds to the at least one of an application or information and the level of magnification satisfies the level of magnification threshold;
receive a second user input indicating a location within the region after causing the region of the image to be magnified to the level of magnification;
wherein the location within the region indicated by the second user input comprises an icon presented over the image at the location such that the icon corresponds to the at least one application or information; and
wherein the program code portions are further configured, upon execution, to determine whether the level of magnification satisfies the level of magnification threshold by determining whether a size of the icon within the region satisfies a predetermined size such that the icon is selectable by a user.

12. The non-transitory computer readable medium of claim 11, wherein the program code portions are further configured, upon execution, to determine whether the level of magnification satisfies the level of magnification threshold by determining whether a graphical element within the region defines a size that occupies a predetermined area of the display.

13. The non-transitory computer readable medium of claim 11, wherein the program code portions are further configured, upon execution, to:
determine whether the location within the region corresponds to at least one of an application or information; and
cause the at least one application to be launched or information to be accessed by causing the at least one application to be launched or information to be accessed in an instance in which (i) the region corresponds to the at least one of an application or information, (ii) the level of magnification satisfies the level of magnification threshold, and (iii) the location within the region corresponds to the at least one application or information.

14. The non-transitory computer readable medium according to claim 11, wherein the program code portions are further configured, upon execution, to cause the image to be presented on the display of a device, wherein the image defines a plurality of regions, wherein each region corresponds to at least one different application or information, and wherein at least two different regions each correspond to a different level of magnification threshold.

* * * * *